US 7,754,635 B2

(12) United States Patent
McKenna

(10) Patent No.: US 7,754,635 B2
(45) Date of Patent: Jul. 13, 2010

(54) CATALYST REPROCESSING

(75) Inventor: Mark McKenna, Cleveland (GB)

(73) Assignee: Johnson Matthey PLC, London (GB)

(*) Notice: Subject to any disclaimer, the term of this patent is extended or adjusted under 35 U.S.C. 154(b) by 0 days.

(21) Appl. No.: 12/281,409

(22) PCT Filed: Feb. 20, 2007

(86) PCT No.: PCT/GB2007/050073

§ 371 (c)(1),
(2), (4) Date: Sep. 2, 2008

(87) PCT Pub. No.: WO2007/099365

PCT Pub. Date: Sep. 7, 2007

(65) Prior Publication Data

US 2009/0038441 A1    Feb. 12, 2009

(30) Foreign Application Priority Data

Mar. 3, 2006    (GB) .................... 0604285.7

(51) Int. Cl.
*B01J 38/48* (2006.01)
(52) U.S. Cl. .................................. 502/22; 502/20
(58) Field of Classification Search .......... 502/22, 502/20
See application file for complete search history.

(56) References Cited

U.S. PATENT DOCUMENTS

| 4,584,140 | A | | 4/1986 | Blewett et al. |
| 5,827,903 | A | * | 10/1998 | White et al. ............. 518/710 |
| 2003/0144128 | A1 | * | 7/2003 | Daage et al. ............. 502/23 |
| 2004/0087824 | A1 | * | 5/2004 | O'Rear et al. .......... 585/651 |
| 2004/0106511 | A1 | * | 6/2004 | Elomari .................... 502/64 |
| 2005/0245778 | A1 | * | 11/2005 | Johnson et al. .......... 585/330 |
| 2006/0065573 | A1 | * | 3/2006 | Dieckmann et al. ...... 208/21 |

FOREIGN PATENT DOCUMENTS

| DE | 28 53 065 A1 | 6/1980 |
| WO | WO-01/66214 A1 | 9/2001 |
| WO | WO-01/83834 A1 | 11/2001 |
| WO | WO-02/18663 A2 | 3/2002 |

OTHER PUBLICATIONS

J. C. Crause et al., "Paraffin wax fractionation: state of the art vs. supercritical fluid fractionation," *J. of Supercritical Fluids*, vol. 27, Issue 1, Sep. 2003, pp. 39-54.

R. H. Matjie et al., "The selective dissolution of alumina, cobalt and platinum from a calcined spent catalyst using different lixiviants," *Minerals Engineering*, vol. 18, Issue 8, Jul. 2005, pp. 801-810.

* cited by examiner

*Primary Examiner*—Timothy C Vanoy
*Assistant Examiner*—Michelle Hou
(74) *Attorney, Agent, or Firm*—RatnerPrestia

(57) ABSTRACT

A process for re-processing of a Fischer-Tropsch catalyst is described comprising the steps of; (i) de-waxing the Fischer-Tropsch catalyst, (ii) subjecting the de-waxed catalyst to hydrometallurgical leaching or extraction to separate catalyst metal or metals from catalyst support material, and (iii) recovering the separated catalyst metal or metals, wherein the de-waxing step is performed using a pressurised near-critical or supercritical fluid under conditions that minimise catalyst metal spinel formation.

13 Claims, No Drawings

CATALYST REPROCESSING

This invention relates to a process for reprocessing Fischer-Tropsch catalysts, in particular to a process for breaking the catalyst down into the catalyst's component parts, e.g. for the purpose of recycling.

Fischer-Tropsch catalysts typically comprise iron or cobalt in the reduced state, dispersed on a suitable support material, such as alumina, silica, titania or zirconia or mixtures of these. Promoter metals such as precious metals and metal compounds such as transition metal oxides are also often present to enhance the catalyst performance.

The catalysts may be used in fixed bed, fluidised bed or slurry reactors, including so-called slurry bubble column reactors (SBCR) where they catalyse the reaction between carbon monoxide and hydrogen to generate hydrocarbons, desirably C5+hydrocarbons. Water is generated as a by-product and is separated from the hydrocarbons before their further processing.

During use the catalysts can become de-activated and/or their selectivity towards the desired hydrocarbons may be reduced. In such cases it may be desirable to subject the catalyst to a form of regeneration in an attempt to recover the catalyst properties.

However where the catalyst may no-longer be regenerated the catalyst requires disposal. Catalyst disposal presents a number of problems because of the catalyst composition and its physical properties. Therefore it has become desirable to consider methods for catalyst re-processing whereby the catalyst components are separated and recovered. In particular, where the catalyst comprises expensive metals such as cobalt and precious metals, catalyst re-processing is desirable.

WO 02/18663 describes a process for reprocessing and recovering cobalt, platinum and aluminium from a used platinum-promoted cobalt on alumina Fischer-Tropsch catalyst. The used catalyst was de-waxed by a combination of combustion and calcination at 600-1400° C. in air. Calcination at these temperatures was found to be necessary to reduce the residual organic content to acceptable levels. The calcined material was then subjected to hydrometallurgical leaching of the calcined material by sequentially treating it with alkali and acids to separate the catalyst into its component parts. Cobalt aluminate spinel formation was observed on calcination of the combusted material and was the major contaminant in the residue obtained after the aluminium, cobalt and platinum extraction. Hence with calcination, Co-support spinel formation was observed and the spinel was resistant to the subsequent hydrometallurgical leaching steps.

We have developed an alternative process that avoids the need for a calcination step and therefore the formation of undesirable spinels.

Accordingly the invention provides a process for re-processing of a Fischer-Tropsch catalyst comprising the steps of;
(i) de-waxing the Fischer-Tropsch catalyst,
(ii) subjecting the de-waxed catalyst to hydrometallurgical leaching or extraction to separate catalyst metal or metals from catalyst support material, and
(iii) recovering the separated catalyst metal or metals, wherein the de-waxing step is performed using a pressurised near-critical or supercritical fluid under conditions that minimise catalyst metal-support spinel formation.

A used Fischer-Tropsch catalyst comprises catalyst particles or shaped units dispersed in or coated with a solid hydrocarbon wax, often in the form of irregular lumps or particles e.g. up to about 10 cm in size. The catalyst particles dispersed within the wax may be in the range 0.1-100 microns diameter, e.g. 0.1-50 microns if the used catalyst has been recovered from a fluidised bed or slurry bubble column reactor. Shaped units are used in fixed bed reactors and may be in the form of cylinders, spheres, pellets or extrudates up to 25 mm in diameter, typically with an aspect ratio <2. The used catalyst may also comprise an amount e.g. up to 2% wt, of 'fines' formed by attrition of catalyst particles in use. Fines may have particles sizes <0.1 micron.

The relative amounts of catalyst material and wax will depend on the source of the used catalyst. For example the amount of wax may be between 5 and 95% of the weight of the used catalyst. For a catalyst derived from a SBCR the amount of wax may be in the range 5-60% wt. Preferably the amount of wax is below 50% wt, more preferably below 40% wt. The initial wax level may be reduced by means of physical separation e.g. settling or centrifuging the solids from the molten wax.

The catalyst comprises catalyst metal or metals, which may be in elemental or oxidised form, and a support material. By "catalyst metal or metals" we mean the catalytically active metal such as iron or cobalt and also promoter metals that may be used to enhance the catalyst performance. The promoter metals include precious metals such as platinum, palladium, rhenium, iridium and rhodium and transition metals selected from molybdenum (Mo), nickel (Ni), copper (Cu), manganese (Mn), titanium (Ti), zirconium (Zr), lanthanum (La), cerium (Ce), chromium (Cr), magnesium (Mg) or zinc (Zn). The promoter metals of particular value in re-processing are the precious metals, e.g. Rh, Ru, Re, Pt and Pd. By "support material" we mean the catalytically-inert oxidic support material, such as alumina, silica, titania, zirconia and mixtures of these. Support materials may also comprise one or more inert oxides coated on another inert oxide, e.g. zirconia-coated silica or alumina-coated titania or vice versa.

Both iron and cobalt are able to form spinel compounds with inert support materials but whereas the present invention may be applied to iron-based Fischer Tropsch catalysts, it is of particular use for cobalt-based Fischer Tropsch catalysts. A particular combination of catalyst metal and support material is cobalt and alumina, which on heating above 500° C. forms cobalt aluminate. Catalyst-support spinels such as cobalt aluminate are resistant to hydrometallurgical leaching and therefore by minimising the catalyst-support spinel formation the present process offers an improved re-processing method.

The amount of catalytically active metal in the catalyst particles or shaped units is preferably in the range 5-75% wt, more preferably 15-50% wt for cobalt-based catalysts. The amount of promoter metal may be up to 10% wt, preferably up to 5% wt on catalyst.

In the de-waxing step, the catalyst may be first sized, e.g. by crushing or grinding and sieving to provide a consistently sized starting material e.g. of up to 5 mm, and then passed to a vessel where it is subjected to washing with a pressurised fluid to remove the wax. Single or multiple washing steps may be employed. Washing is preferably continued until the residual wax volume is less than the pore volume of the catalyst, at which point the material is a free-flowing powder. Preferably the wax level, as measured by retained carbon content of dried material, is $\leq 1.0\%$ more preferably $\leq 0.5\%$ carbon by weight.

The pressurised fluid may be a suitable hydrocarbon, alcohol or water at or about supercritical temperature and pressure. Preferably the hydrocarbon is a C3-C12 alkane or mixture of one or more C3-C12 alkanes, more preferably a C3-C8 alkane or a mixture of C3-C8 alkanes. Preferred hydrocarbons are propane, butane, pentane and hexane. Suitable alcohols are C2, C3 or C4 alcohols. A particularly preferred alcohol is iso-propanol.

The fluid used to de-wax the catalyst is near-critical or supercritical, i.e. it is at an elevated pressure and temperature where the fluid possesses the solubilising properties of the liquid but with mass transfer properties more similar to the fluid vapour. The fluid may be near-critical (e.g. at a pressure at or above 80% of the critical pressure, Pc, and/or at a temperature at or above 80% of the critical temperature, Tc, for that fluid), or in a supercritical state (whereby P≧Pc and T≧Tc). The appropriate temperature and pressure required for the fluid to be supercritical are known but typically are in the range 150-450° C. and 10-300 bar. For example, the critical temperature for iso-propanol is 235° C. It will be understood that where the fluid is a mixture of different molecules, the critical pressure and temperature of the fluid mixture will be a range with the range depending upon the composition of the solvent. Preferably the de-waxing is performed below 600° C., more preferably below 550° C., most preferably below 500° C. to minimise spinel formation.

The pressurised fluid is preferably prepared in a separate vessel at temperature and pressure and supplied to the catalyst vessel, which has been pressurised to near or about the critical pressure. The fluid is preferably stored in a separate vessel and pumped into the catalyst vessel via a heat exchanger. The catalyst may also be heated prior to washing to mobilise the wax and improve the efficiency of the washing step. The catalyst may be de-waxed by subjecting it to single or multiple washing steps in a batch operation in a single vessel, or may be subjected to washing in a series of vessels in a continuous washing process.

Using a near-critical or supercritical fluid to de-wax the catalyst is considerably more effective than simply washing the catalyst with solvent at lower temperatures or pressures.

The de-waxed catalyst may then be subjected, preferably after a drying step to remove any fluid, to hydrometallurgical extraction of the catalyst components. No calcination of the de-waxed catalyst is required or desired prior to hydrometallurgical extraction.

The resulting recovered wax solution may be subjected to further processing, e.g. distillation, to recover the fluid and the wax product.

The hydrometallurgical separation of catalyst metal or metals from the support material may include selective dissolution of the catalyst metal or metals or the support material. Methods for selective extraction or precipitation are known, e.g. as described in the aforesaid WO 02/18663. The selective dissolution may be performed using acidic, alkaline or neutral aqueous solutions at elevated temperature (>50° C.) and pressures up to about 20 bar abs and/or using extraction of the metal or metals using suitable extractant molecules that form complexes with the metals. Suitable acids include nitric acid, aqua-regia and sulphuric acid, and suitable alkalis include sodium hydroxide and potassium hydroxide. Suitable extractant molecules include phosphate esters.

In particular, alumina may be dissolved by treatment of the de-waxed catalyst with aqueous alkali, especially a sodium hydroxide solution. This has the advantage that sodium aluminate is produced. Sodium aluminate may be used to precipitate the aluminium as aluminium hydrates, e.g. by addition of a suitable acid. Aluminium hydrates are useful support materials for catalysts. The sodium hydroxide solution is preferably ≧20% wt NaOH in water at temperatures between 60 and 180° C., preferably 100-170° C. and at pressures in the range 1-20 bar abs, preferably 5-20 bar abs for between 0.5 and 16 hours, preferably 1-8 hours. The treatment may be by washing a fixed bed of the catalyst material in the vessel or by combining the de-waxed catalyst and aqueous acid in a stirred vessel followed by filtration or centrifugation to remove undissolved material. One or more treatments may be performed to maximise the recovered aluminium. If desired a suitable flocculant or coagulant may be added to the resulting alkali mixture to assist removal of suspended solids.

Cobalt may be dissolved from the de-waxed catalyst using an aqueous acid, for example a nitric acid or sulphuric acid solution. Using nitric acid has the benefit that cobalt nitrate may be subsequently crystallised (as a hydrate) from the solution. Cobalt nitrate is a common starting material for producing cobalt-based catalysts. The nitric acid solution is preferably ≧20% wt nitric acid in water at temperatures between 60 and 150° C., preferably 80-120° C. and at pressures in the range 1-20 bar abs, preferably 1-5 bar abs for between 0.5 and 16 hours, preferably 1-8 hours.

The acid treatment may be by washing a fixed bed of the catalyst material in the vessel or by combining the de-waxed catalyst and aqueous acid in a stirred vessel followed by filtration or centrifugation to remove undissolved material. One or more treatments may be performed to maximise the recovered cobalt. Again, if desired a flocculating agent or coagulant (suitable for use in acidic media) may be added to the resulting acidic mixture to assist removal of suspended solids.

As an alternative to acid-extraction of Co, it is possible to subject aqueous solutions with a suitable organic extractant known to be useful for Co, such as a phosphate ester, e.g. di(2-ethylhexyl) phosphoric acid.

Precious metals such as platinum are resistant to being dissolved in acid solutions and require treatment with stronger acids to provide solutions suitable for metal recovery. Pt can dissolve in 6-18M aquaregia (a solution of HCl and $HNO_3$) above 80° C. at atmospheric pressure to form hexachloroplatinic acid ($H_2PtCl_6$) in solution. The hexachloroplatinic acid may be recovered directly or as a salt, e.g. the ammonium salt, by addition of ammonium hydroxide to a hexachloroplatinic acid solution. Hexachloroplatinic acid is used as a homogeneous catalyst or as a precursor to other platinum salts and may also be used as a precursor to platinum metal.

Alternatively methods may be used to recover precious metals, e.g. rhenium may be recovered by treatment with acid and peroxide, followed by ion exchange on a suitable ion-exchange material.

Thus in one embodiment, a used Fischer Tropsch catalyst comprising a precious metal, cobalt and alumina is subjected to an initial de-waxing step using a supercritical fluid at supercritical pressure and temperature below 600° C. to obtain de-waxed catalyst having a carbon content ≦1.0%, preferably ≦0.5% by weight. The de-waxed catalyst is then subjected to a step of alkaline leaching and filtration to separate the aluminium, preferably as sodium aluminate. The remaining Co-precious metal residue is then subjected to an acid leaching and filtration step that separates the cobalt, preferably as a cobalt salt, e.g. cobalt nitrate. The precious metal may then be separated from the insoluble residues either by subjecting them to treatment with a strong acid or other methods, e.g. treatment with acid and peroxide, followed by ion exchange on a suitable ion-exchange material. The latter method is preferred where the precious metal is rhenium, in which case the rhenium may be recovered preferably at ammonium perrhenate ($NH_4ReO_4$).

In an alternative embodiment, a used Fischer Tropsch catalyst comprising rhenium, cobalt and alumina is subjected to an initial de-waxing step using a supercritical fluid at supercritical pressure and temperature below 600° C. to obtain de-waxed catalyst having a carbon content $\leq 1.0\%$, preferably $\leq 0.5\%$ by weight. The de-waxed catalyst is then subjected to a step of acid leaching, preferably with nitric acid, at elevated temperature to separate cobalt and rhenium from the bulk of the aluminium. The aluminium is precipitated initially followed by the cobalt and therefore by controlling the process some further separation of aluminium and cobalt may be possible. The cobalt and any aluminium may then be precipitated with a base, e.g. CaO, to leave a relatively pure $[ReO_4]$ solution from which may be obtained ammonium perrhenate. This method is preferable to the sequential alkali/acid treatment as separation of the aluminium from the catalyst is improved. High recovery of Re is possible and Co may be obtained in satisfactory purity.

The invention is further illustrated by reference to the following examples.

EXAMPLE 1

Supercritical water (500 ml) at 408° C. and 241 bar was passed over a 5 g lump sample of used commercial Fischer Tropsch catalyst comprising ca 20% wt Co and 1% wt Re on gamma-alumina in a FT wax (ca 40% catalyst: 60% wax) for 1.5 hours. Wax was removed effectively resulting in a de-waxed catalyst having a carbon content of 0.6% by weight.

The experiment was repeated, treating a 17.5 g lump sample of waxy catalyst with 1000 ml near-critical or supercritical iso-propanol at 224-248° C. for 3 hours at 152-172 bar, resulting in a de-waxed catalyst having a low retained carbon level.

EXAMPLE 2

Samples of a Fischer-Tropsch catalyst were de-waxed either by;
 a) calcination according to previous methods or
 b) treatment with near-critical iso-propanol according to the present invention.

In the comparative example, a reduced and encapsulated catalyst (comprising 20% Co on gamma-alumina) was calcined at 800° C. in air. The ramp rate for the calcinations was 100° C./hr from 100° C. to 800° C. The residual carbon on the calcined material was determined by LECO analysis to be 0.08% by weight. A temperature-programmed-reduction (TPR) trace of the material revealed the presence of a considerable amount of cobalt aluminate spinel, further evidences by its blue colour.

In the method according to the present invention, a reduced and encapsulated catalyst (comprising 20% Co on alumina) was subjected to iso-propanol de-waxing according to the following procedure. A 1427 g mass comprising catalyst and wax was loaded into an extraction chamber, which was then placed inside a large oven. The catalyst content of the mass was approximately 50% wt. Iso-propanol was passed through the heated vessel at a flowrate of 10 kg/h at 210° C. and 45 bar for 15 minutes. The flowrate was then increased to 19.5 kg/h for 15 minutes with a very short initial burst of stirring at 240 rpm. The flowrate was maintained at this value for the duration of the extraction. The exit temperature decreased to 198° C. and then 191° C. over the first 2 hrs of extraction, although the pressure remained constant. Short periods of stirring were used about every 30 min to ensure sufficient contact between the iso-propanol and catalyst. After 5 hrs, the flow of iso-propanol was stopped. The pressure was reduced to about 6 bar and the catalyst was passivated initially using a blend of 1 v/v % $CO_2$ in nitrogen for 20 minutes, followed in succession by a 1:1 $CO_2:N_2$ mixture for 5 minutes and then by a pure $CO_2$ stream for a further 10 minutes at the same flowrate. Following a ten minute period post any further change in temperature, during which time a nitrogen purge of any remaining $CO_2$ from the system was undertaken, the sample was exposed carefully to a normal air environment—no exotherm was observed. The residual carbon content of the de-waxed catalyst was determined by LECO to be 0.2% by weight. TPR indicated significantly less spinel forming than that the calcined material and the catalyst remained black in colour.

The calcined and near-critical iso-propanol de-waxed materials were then both subjected to an acid leaching based on the method proposed by Matjie et al., (see Minerals Engineering, Volume 18, Issue 8, July 2005, pp 801-810) using sulphuric acid solution. The acid leaching runs were conducted with 2.5M $H_2SO_4$, but with the volume decreased to maintain the same proton concentration as that used by Matjie et al. Two extractions using 250 g calcined material per acid leaching batch yielded Co and Al recoveries of 28±3% wt and 30±2% wt respectively. Metal recovery in the acidic solutions was established using ICP-atomic emission spectroscopy. In contrast, the leaching of near-critical iso-propanol de-waxed material produced a leachate solution that was by observation, a deeper colour of red than that extracted from calcined material. ICP analysis yielded a Co recovery of 88% wt and an Al recovery of 42% wt in solution. The selectivity to Co in the acid leaching was a surprising result of using the near-critical iso-propanol de-waxing technique, which is not predicted by the work of Matjie et al.

The recovery of the Co from the acidic solution can be accomplished using methods known in the art, such as neutralisation, partial neutralisation followed by precipitation via oxidation or precipitation via reagent addition, any of which would then utilise downstream filtration in combination with, and or/ion exchange or solvent extraction processing steps, dependent on the route selected and starting catalyst composition.

The invention claimed is:

1. A process for re-processing of a Fischer-Tropsch catalyst comprising the steps of
 (i) de-waxing the Fischer-Tropsch catalyst,
 (ii) subjecting the de-waxed catalyst to hydrometallurgical leaching or extraction to separate catalyst metal or metals from a catalyst support material, and
 (iii) recovering the separated catalyst metal or metals, wherein the de-waxing step is performed using a pressurised near-critical or supercritical fluid selected from the group consisting of one or more of C3-C12 alkanes, one or more C2-C4 alcohols, or water under conditions that minimise catalyst metal-support spinel formation.

2. A process according to claim 1 wherein the catalyst is a cobalt-based Fisher-Tropsch catalyst.

3. A process according to claim 1 wherein the catalyst comprises cobalt and alumina and the spinel is cobalt aluminate.

4. A process according to claim 1 wherein the catalyst metals include a precious metal.

5. A process according to claim 4 wherein the precious metal is selected from the group consisting of platinum, rhenium or ruthenium.

6. A process according to claim 1 wherein the pressurised fluid is near-critical or supercritical iso-propanol.

7. A process according to claim 1 wherein the pressurised fluid is applied to the catalyst at a temperature below 600° C.

8. A process according to claim 1 wherein the hydrometallurgical leaching comprises selective dissolution using acidic, alkaline or neutral aqueous solutions at elevated temperature above 50° C. and pressures up to about 20 bar abs and/or extraction of the catalyst metal or metals using suitable extractant molecules that form complexes with the catalyst metal or metals.

9. A process according to claim 1 wherein the catalyst metal or metals are recovered by filtration, precipitation, separation or flocculation.

10. A process according to claim 1 wherein the Fischer Tropsch catalyst comprises a precious metal, cobalt and alumina and is subjected to steps comprising:
   (i) de-waxing using the pressurised fluid at near-critical or supercritical conditions at a temperature below 600° C. to obtain de-waxed catalyst having a carbon content $\leq$1% wt,
   (ii) subjecting the de-waxed catalyst to a step of alkaline leaching and filtration to separate the aluminium,
   (iii) subjecting the remaining cobalt/precious metal residue to an acid leaching and filtration step that separates the cobalt, and
   (iv) subjecting the precious metal in the insoluble residues to treatment with a strong acid or treatment with acid and peroxide, followed by ion exchange on a suitable ion-exchange material.

11. A process according to claim 10, wherein the aluminium is separated as sodium aluminate.

12. A process according to claim 10, wherein the cobalt is separated as a cobalt salt.

13. A process according to claim 1 wherein the Fischer Tropsch catalyst comprises rhenium, cobalt and alumina and is subjected to steps comprising;
   (i) de-waxing using a pressurised fluid at near-critical or supercritical conditions at a temperature below 600° C. to obtain a de-waxed catalyst having a carbon content $\leq$1% wt,
   (ii) subjecting the de-waxed catalyst to a step of acid leaching at elevated temperature to separate cobalt and rhenium from the bulk of the aluminium, and
   (iii) precipitating the aluminium and cobalt with a base to leave a relatively pure [ReO$_4$] solution.

* * * * *